United States Patent [19]

Hashimoto et al.

[11] Patent Number: 5,522,256
[45] Date of Patent: Jun. 4, 1996

[54] CYLINDER DISCRIMINATING APPARATUS FOR INTERNAL COMBUSTION ENGINE

[75] Inventors: Atsuko Hashimoto; Wataru Fukui, both of Hyogo, Japan

[73] Assignee: Mitsubishi Denki Kabushiki Kaisha, Tokyo, Japan

[21] Appl. No.: 434,055

[22] Filed: May 3, 1995

[30] Foreign Application Priority Data

Nov. 7, 1994 [JP] Japan ................................. 6-272297

[51] Int. Cl.⁶ ........................ G01M 15/00; F02D 45/00; F02P 5/15
[52] U.S. Cl. ........................................................... 73/116
[58] Field of Search .................................. 73/116, 117.2, 73/117.3; 123/414, 419

[56] References Cited

U.S. PATENT DOCUMENTS

| | | | |
|---|---|---|---|
| 4,924,830 | 5/1990 | Abe | 73/117.3 |
| 4,989,448 | 2/1991 | Fukui et al. | 73/116 |
| 5,044,336 | 9/1991 | Fukui | 73/116 |
| 5,056,360 | 10/1991 | Dosdall et al. | 73/116 |
| 5,070,726 | 12/1991 | Fukui et al. | 73/116 |
| 5,070,727 | 12/1991 | Davis et al. | 73/116 |
| 5,117,681 | 6/1992 | Dosdall et al. | 73/116 |
| 5,119,670 | 6/1992 | Whitehorn et al. | 73/116 |
| 5,165,271 | 11/1992 | Stepper et al. | 73/116 |
| 5,233,961 | 8/1993 | Fukui et al. | 123/419 |
| 5,325,710 | 7/1994 | Morikawa | 73/116 |
| 5,387,253 | 2/1995 | Remboski et al. | 73/117.3 |

FOREIGN PATENT DOCUMENTS 1219341  9/1989  Japan .
3121238  5/1991  Japan .

*Primary Examiner*—Brian Zimmerman
*Assistant Examiner*—George M. Dombroske
*Attorney, Agent, or Firm*—Sughrue, Mion, Zinn, Macpeak & Seas; Richard C. Turner; Laura C. Brutman

[57] ABSTRACT

A device for discriminating cylinders in an internal combustion engine includes a rotational fluctuation detecting means for detecting a rotational fluctuation in an internal combustion engine on the basis of a rotary signal, cylinder discriminating means for discriminating a cylinder on the basis of the time interval between reference angular positions, inhibiting means for inhibiting cylinder discrimination by said cylinder discrimination means when the rotational fluctuation detecting means detects a rotational fluctuation, and cylinder predicting means for predicting and discriminating a cylinder from the past cylinder discrimination result when said inhibiting means inhibits cylinder discrimination by the said cylinder discriminating means. Thus, the cylinder discriminating device for an internal combustion engine with no error irrespectively of the running state of the engine.

5 Claims, 4 Drawing Sheets

CYLINDER DISCRIMINATING APPARATUS FOR INTERNAL COMBUSTION ENGINE

BACKGROUND OF THE INVENTION

The present invention relates to an apparatus for discriminating cylinders of an internal combustion engine on the basis of the signal from a single system of a rotary signal generator for detecting the rotary angle of the internal combustion engine having plural cylinders.

Conventionally, as such a kind of a cylinder discriminating apparatus, a technique as disclosed in e.g. Unexamined Japanese Patent Publication Hei-3-121238 has been known.

In response to the square wave signal from a single system of a rotary signal generator, the cylinder discriminating apparatus discriminates cylinders on the basis of the ratio of the duration of its H level to one period of the square wave signal.

Such a cylinder discriminating method is established only when the revolution of the internal combustion engine is stable, but may erroneously discriminate the cylinders when it is unstable. This is because the square wave signal alters when the number of revolutions is unstable. Hence, errors are included in the ratio of the duration of its H level to the one period of the square wave signal.

In order to obviate such an inconvenience, since the cylinders may be erroneously discriminated at the starting time when the revolution is not stable, the technique disclosed in the above reference inhibits discriminating cylinders during a predetermined time.

However, the conventional cylinder discriminating device has bare possibility of erroneously discriminating cylinders at the starting time, but cannot prevent cylinders from being erroneously discriminated in an operation when rotational fluctuation occurs in a running state after starting, such as incomplete clutching operation.

SUMMARY OF THE INVENTION

The present invention has been completed in order to solve the above problem. An object of the present invention is to provide an apparatus for discriminating cylinders in an internal combustion engine without any error.

Another object of the present invention is to surely detect rotational fluctuation in the combustion engine in the cylinder discriminating apparatus free from erroneous discrimination.

Another object of the present invention is to simplify the apparatus for discriminating cylinders in an internal combustion engine free from the above erroneous discrimination.

In order to attain the above objects, a device for discriminating cylinders in an internal combustion engine according to the present invention includes a rotational fluctuation detecting means for detecting a rotational fluctuation in an internal combustion engine on the basis of a rotary signal, cylinder discriminating means for discriminating a cylinder on the basis of the time interval between reference angular positions, inhibiting means for inhibiting cylinder discrimination by said cylinder discrimination means when the rotational fluctuation detecting means detects a rotational fluctuation, and cylinder predicting-means for predicting and discriminating a cylinder from the past cylinder discrimination result when said inhibiting means inhibits cylinder discrimination by the said cylinder discriminating means.

The cylinder discriminating device according to the present invention further comprises ratio calculating means for calculating the ratio of the time interval between the first and second reference angular positions to the period of a rotary signal, or the ratio of the time interval between the third and fourth angular positions to the period of the rotary signal.

In the cylinder discriminating device according to the present invention, the rotational fluctuation detecting means has two upper and lower decision values.

In the cylinder discriminating device according to the present invention said rotational fluctuation detecting means measures the time interval between said reference angular position and detects the rotational fluctuation in the internal combustion engine on the basis of the time interval measured at a previous time and the time interval measured at subsequent time.

The device for discriminating cylinders in an internal combustion engine having a plurality of cylinders according to the present invention comprises: angle detecting means for generating, in synchronism with the rotation of the internal combustion engine, a rotary signal having a reference angular position signal at first and second reference angular positions corresponding to each of the cylinders and at third and fourth reference angular positions corresponding to a specific cylinder; ratio calculating means for calculating the ratio of the time interval between the first reference angular position and second reference angular position to the period of a rotary signal, or the ratio of the time interval between the third reference angular position and fourth angular position to the period of the rotary signal; ratio fluctuation coefficient calculating means for calculating the fluctuation coefficient of said ratio on the basis of a difference between the ratio at the previous time and that at this time which have been obtained by said fluctuation ratio calculating means; rotational fluctuation detecting means for detecting the rotational fluctuation in the internal combustion engine on the basis of the fluctuation coefficient of said ratio; cylinder discriminating detecting the rotational fluctuation on the basis of the changing coefficient of said ratio; cylinder predicting means for inhibiting cylinder when said rotational fluctuation detecting means detects a rotational fluctuation and predicting a cylinder from the past cylinder discrimination result.

In accordance with the present invention, when rotational fluctuation in an internal combustion engine is detected, cylinder discrimination is inhibited to discriminate cylinders predictively on the basis of the past cylinder discrimination result so that the cylinders can be discriminated with no error.

Further, in accordance with the present invention, the ratio of the time interval between reference angular positions to the period of a rotary signal is calculated and it is compared to a reference value so that the rotational fluctuation in an internal combustion engine can be detected surely.

Moreover, in accordance with the present invention, the rotational fluctuation detecting means has two decision values of an upper limit and a lower limit so that the rotational fluctuation in the internal combustion engine can be detected surely.

Furthermore, in accordance with the present invention, the rotational fluctuation in an internal combustion engine is detected on the basis of a difference between time intervals between reference angle positions at the-previous time and at this time so that the structure of the discrimination apparatus can be simplified.

Further, in accordance with the present invention, the result of calculation in the fluctuation ratio calculation means is used to detect rotational fluctuation and discriminate a cylinder so that the structure of the cylinder discriminating apparatus can be simplified.

The above and other objects and features of the present invention will be more apparent from the following description taken in conjunction with the accompanying drawings.

DESCRIPTION OF THE PREFERRED EMBODIMENTS

Embodiment 1

Figure 1:
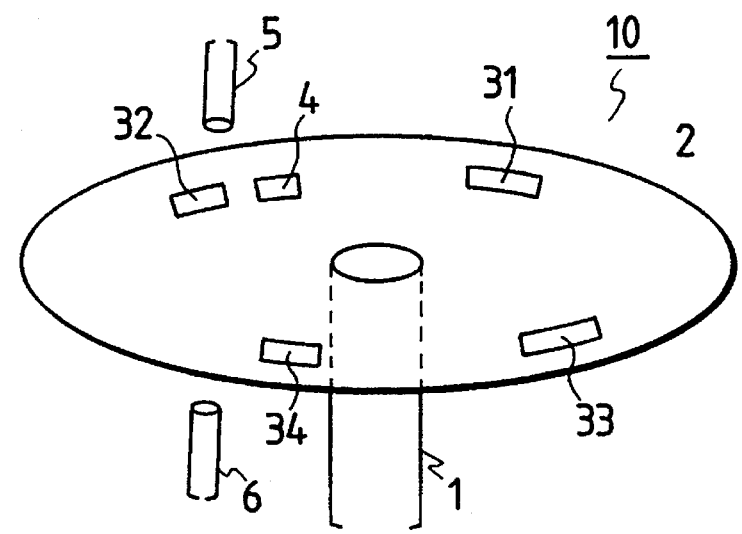
FIG. 1 is a partial arrangement view showing a portion of the arrangement of a rotary signal generator used in the present invention.

FIG. 1 is a partial arrangement view showing a part of the arrangement of a rotary signal generator according to the present invention. In FIG. 1, reference numeral 1 denotes a rotary shaft which rotates in synchronism with the crank shaft of an internal combustion engine having four cylinders (not shown); 2, a rotary disk attached to the rotary shaft 1 and rotating together with it; 31 to 34, windows corresponding to the first and second reference angular positions of the first to fourth cylinders of the internal combustion engine; 4, windows corresponding to the third and fourth reference angular positions of a first cylinder; 5, an emitting diode which is provided on an extended line in the direction of the rotary shaft of the windows 31 to 34 and 4 and projects light toward the rotary disk 2; and 6, a photodiode which is provided in opposition to the light emitting diode 5 through the rotary disk 2 and receives the light projected from the light emitting diode 5. The reference numeral 10 denotes a rotary signal generator serves as an angle detecting means constituted by the above components 1 to 6.

Figure 2:
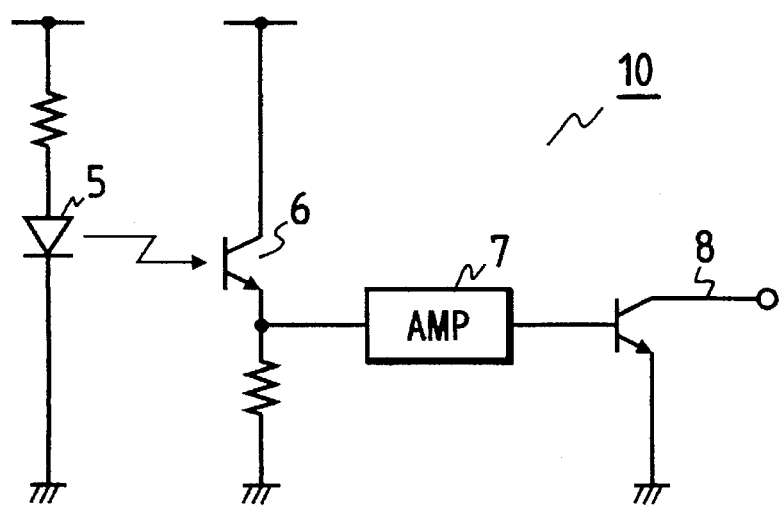
FIG. 2 is a circuit diagram of the rotary signal generator used in the present invention.
Figure 3:
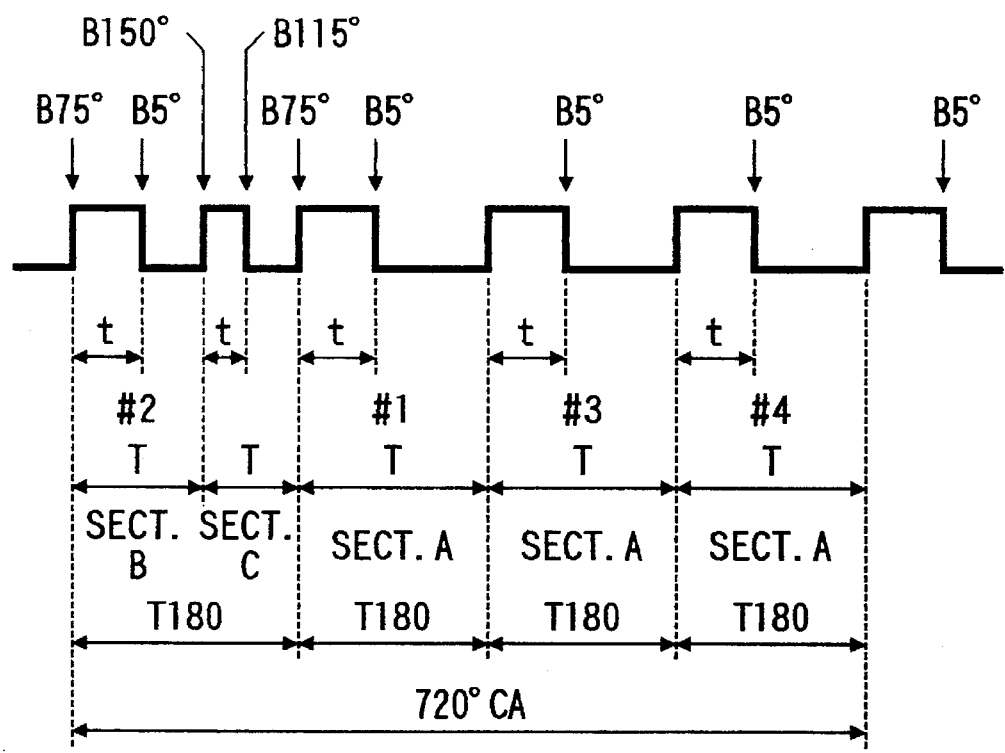
FIG. 3 is a timing chart showing the rotary signal outputted from the rotary signal generator used in the present invention.

Now referring to FIGS. 2 and 3, an explanation will be given of the operation of the rotary signal generator 10. FIG. 2 is a circuit diagram of the rotary signal generator 10. FIG. 3 is a timing chart of the rotary signal outputted from the rotary signal generator 10. In FIG. 2, reference numeral 7 denotes an amplifying circuit for amplifying the signal from the photodiode 6; and 8 a transistor with its collector opened which produces a square wave on the basis of the signal from the amplifying circuit 7.

The rotary shaft 1 and the rotary disk 2 rotates synchronously with the rotation of the crank shaft of an internal combustion engine (not shown). The windows 31 to 34 and 4 rotate together with the rotary disk 2 and interrupt or open the space between the light emitting diode 5 and the photodiode 6. When one of the windows 31 to 34 and 4 is located between the light emitting diode 5 and the photodiode 6, the photodiode 6 receives the light from the light emitting diode 5 and converts it into an electric signal to be outputted. This signal is supplied to the amplifying circuit 7 to amplify. The signal amplified by the amplifying circuit 7 is supplied to the base of the transistor 8 to turn on the transistor 8. When the window moves so that the space between the light emitting diode 5 and the photodiode 6 is interrupted, the photodiode 6 stops the photo-electric conversion and ceases to produce any signal. When no signal is produced from the photodiode 6, no signal is produced from the amplifying circuit 7 so that the transistor 8 turns off.

The rotary signal thus generated has the waveform as shown in FIG. 3. In FIG. 3, the square wave is a rotary signal produced from the rotary signal generator 10 to be corresponding to the windows 31 to 34 and the window 4. The rotary signal rises at B75° which is the first reference angular position in each cylinder (which represents an angular position before the upper dead point by 75°; This expression will be adopted in the following description), and falls at B5° or the second reference angular position in each cylinder. The rotary signal also rises at B150° or the third reference angular position of the first cylinder and falls at B115° or the fourth reference angular position of the first cylinder.

Now, the rising and falling edges of the first to fourth reference angular positions serve as reference angular position signals.

Figure 4:
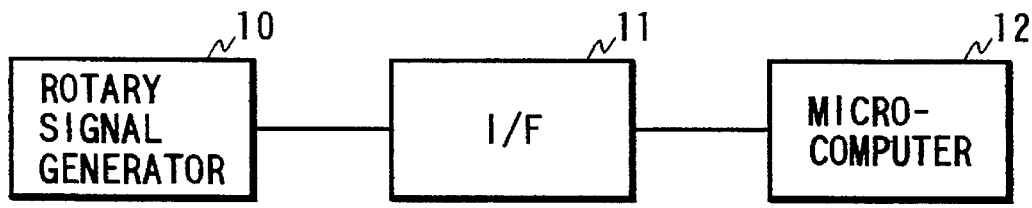
FIG. 4 is a block diagram showing the arrangement of the present invention.

FIG. 4 is a block diagram showing the arrangement of the present invention. In FIG. 4, reference numeral 11 denotes an interface circuit for carrying out a prescribed conversion operation in response to the rotary signal from the rotary signal generator 10, and reference numeral 12 denotes a microcomputer which carries out arithmetic processing in response to the signal from the interface circuit 11.

The rotary signal outputted from the rotary signal generator 10 is supplied to a microcomputer 12 through an interface circuit for several kinds of operations.

Figure 5:
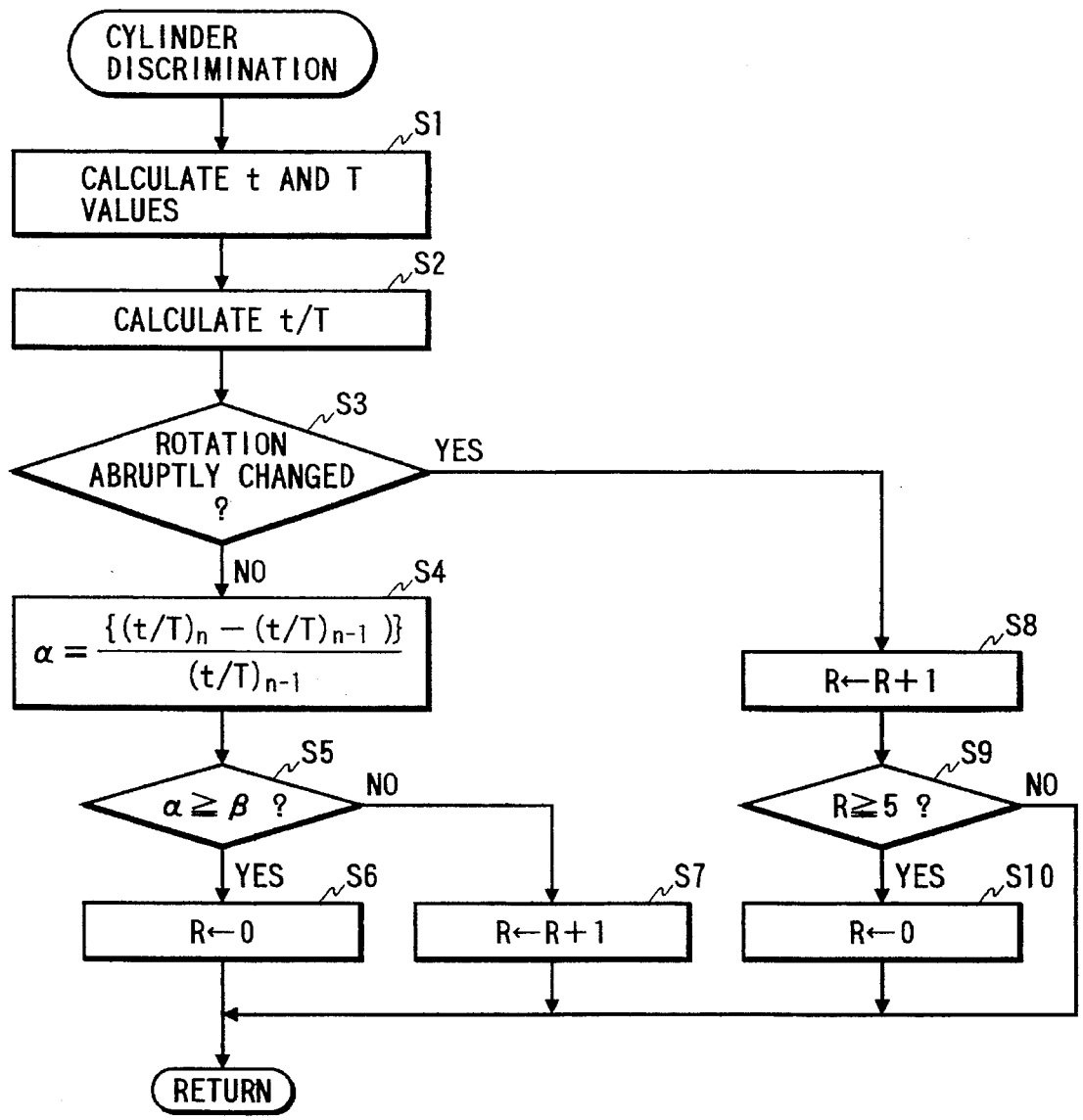
FIG. 5 is a flowchart showing the manner of control by the present invention.

FIG. 5 is a flowchart showing the control by the present invention.

In step S1, on the basis of the rotation signal supplied through the interface circuit 11, the output duration t of the high level signal and the period T of the rotary signal are measured. In the subsequent step, step S2 which is a ratio operating means, the ratio of the output period t to the period T of the rotary signal is calculated.

When the revolution in the internal combustion engine is stable, three kinds of ratios t/T's are obtained.

First, with respect to the ratio of the time interval between the first and second reference angular positions to the period of the rotary signal, there are two kinds of values.

One is that in section A in FIG. 3. In the section A, the time interval t between the first and second reference angular positions indicates the time interval from B75° to B5°, and the period T of the rotary signal indicates the time interval from B75° in a certain period to B75° in the subsequent cylinder.

In the section B of FIG. 3, the time interval t between the first and second angular positions is the time interval from B75° to B5°, and the period T of the rotary signal indicates the time interval from B75° in a certain cylinder to B150° in the subsequent cylinder.

Further, there is a ratio of the third and fourth reference angular positions. In the section C of FIG. 3, the time interval t between the third and fourth angular positions indicates that from B150° to B115°, and the rotation period T indicates the time interval from B150° in the second cylinder to B75° in the subsequent cylinder.

It should be noted that the ratios t/T's are calculated at the rising point of the rotary signal.

Thus, at the rising point in the first cylinder, the ratio t/T in the section C is calculated so that 35/75=0.467 is obtained. Further, at the rising point in the third cylinder and fourth cylinder, the ratio in the section A is calculated so that 70/180=0.389 is obtained. Finally, at the rising point of the second cylinder, the ratio in the section B is calculated so that 70/105=0.667 is obtained.

In step S3 which is rotational fluctuation detecting means, it is detected that the number of revolutions in the internal combustion engine has fluctuated. When the rotational fluctuation in the internal combustion engine has been not detected, the processing is advanced to step S4. On the other hand, the rotational fluctuation in the internal combustion engine has been detected, the processing is advanced to step S8.

The detection of presence or absence in the rotational fluctuation in step S3 will be explained in detail.

When the rotational fluctuation has not been detected in step S3, the processing is advanced to step S4 to calculate a changing coefficient $\alpha$ of the rate. Step S4 serves as a fluctuation coefficient calculating means.

Now, by dividing the result of subtraction from the rate (t/T)n calculated in step S2 at this time by that of subtraction of the rate (t/T)n−1 calculated in step S2 at the previous time, the changing coefficient $\alpha$ of the rate is acquired.

At the rising point in the first cylinder, the rate calculated at this time is that in the interval C, and the rate calculated at the previous time is that in the section B. Thus, the changing coefficient $\alpha$ calculated at the rising point is (0.467−0.667)/0.667=−0.300. At the rising point in the third cylinder, the rate calculated at this time is that in the section A and the rate calculated at the previous time is that in the section C. Thus, the fluctuation coefficient $\alpha$ is (0.389−0.467)/0.467=−0.167. Likewise, at the rising point in the fourth cylinder, $\alpha$=0, at the rising point in the second cylinder, $\alpha$=0, and at the rising time of the signal for discriminating a specific cylinder, $\alpha$=0.715.

After the fluctuation coefficient $\alpha$ of the rate is acquired, the processing is advanced to step S5. The fluctuation coefficient $\alpha$ is compared with a predetermined value $\beta$. This predetermined value is smaller than 0.715 and larger than 0.

In FIG. 3, when the signal for discriminating a specific cylinder has risen, the fluctuation coefficient $\alpha$ of the rate is 0.715. Since this value is larger than the predetermined value $\beta$, the processing is advanced to step S6. In this step, a discrimination register R is cleared to zero. Thus, the processing is ended.

At the rising point in the first cylinder, the ratio fluctuation coefficient $\alpha$ is −0.300 which is smaller than the predetermined value $\beta$. Thus, the processing advances to step S7. In this step, the value of the discrimination register R is incremented. Namely, 1 is added to 0 stored in the discrimination register R. The value of 1 in the discrimination register R represents the first cylinder.

Likewise, the value of the discrimination register R is incremented one by one to update the cylinder information, and the register is cleared to zero again by the signal for discriminating a specific cylinder.

Specifically, when the revolutions of an internal combustion engine is stable, the discrimination register R is cleared to 0 by the signal for discriminating a specific cylinder generated in the section A. Thereafter, the value in the discrimination register R is incremented for each of the cylinder signals in the sections A and B. The microcomputer 12 recognizes which cylinder has been discriminated at this time from the value of the discrimination register R. Steps S5, S6 and S7 constitute cylinder discriminating means.

At the time of abrupt start or "clutch meet", the revolutions in an internal combustion engine fluctuates greatly. The rotational fluctuation is detected in step S3.

When the rotational fluctuation is detected, the processing is advanced to step S8 et seq. In this case, cylinder discrimination by the cylinder discrimination mean is inhibited, and the present cylinder is predicted from the past cylinder discrimination result. Step S3 constitutes inhibiting means.

In step S8, the discrimination register R is incremented.

Now, since there is rotary fluctuation, cylinder discrimination cannot be done on the basis of the above calculation. But since either the cylinder signal or the signal for discriminating a specific cylinder has been now detected, 1 is added to the contents of the discrimination register R which is the past cylinder discrimination result to update the cylinder information.

When the signal now detected is a signal for discriminating a specific cylinder, the value of the discrimination register has become 5.

Thus, in step S9, the contents of the discrimination register R is confirmed. If the contents are 5 or more, it is decided that the signal now decided was the signal for discriminating a specific cylinder. In step S10, the discrimination register R is cleared to 0.

If the contents of the discrimination register R is smaller than 5, the signal now detected is the cylinder signal. Since the cylinder information has been already updated in step S8, in this case, the processing is ended with no action.

Steps S8, S9 and S10 constitute cylinder predicting means.

An explanation will be given of step S3 omitted in the above description.

When rotational fluctuation occurs in the internal combustion engine, the ratio of the high level signal to the low level signal changes. As a result, the ratio t/T becomes an abnormal value which does not correspond to any of the above three kinds of values.

Therefore, the rotational fluctuation can be detected on the basis of the value of the ratio t/T. The upper limit $\gamma1$ of the ratio t/T (e.g. 0.7) and the lower limit $\gamma2$ (e.g. 0.3) are set. If the detected ratio t/T falls within a range between the upper limit $\gamma1$ and the lower limit $\gamma2$, it is decided that the rotational fluctuation is not occurring. If the ratio is outside the above range, it may be decided that the rotational fluctuation is occurring.

The upper limit $\gamma1$ and the lower limit $\gamma2$ constitute decision values.

Although two decision values were prepared in the above embodiment, one decision value may be prepared.

Specifically, there are two kinds of cases of rotational fluctuation of: rise from a stabilized revolution and fall therefrom. For this reason, the upper limit $\gamma1$ and lower limit $\gamma2$ are set.

The case of rise in the number of revolutions includes racing and abrupt acceleration in an internal combustion engine. These events occur relatively often during actual driving.

The case of fall in the number of revolutions includes an accidental fire in the internal combustion engine and abrupt coupling of connection. These events also occur relatively often during actual driving.

However, e.g. in the case of clutch coupling, even if the accidental fire occurs to cause the number of revolutions to fall, rotational force is transmitted to the internal combustion engine from tires so that the fall in the number of revolutions is stopped. Therefore, the case of fall of the number of revolutions provides less rotational fluctuation than in the case of rise in the number of revolutions.

Thus, only the decision value corresponding to the rise in the number of revolutions is given and the decision value in the case of fall may be deleted so that the cylinder discriminating device can be simplified.

In accordance with the first embodiment, in which a rotational fluctuation detecting means is provided, it can be detected whether or not the change in the number of revolutions is occurring. In the present driving state, therefore, it can be decided whether or not there is possibility of erroneously discriminating cylinders.

When the rotational fluctuation is occurring, cylinder discrimination by cylinder discrimination means is inhibited by inhibiting means so that cylinder discrimination based on erroneous data will not be carried out.

Further, in this case, since a cylinder predicting means for predicting a cylinder on the basis of the past cylinder discrimination result is provided, the cylinder can be discriminated even when a change in the number of revolutions has occurred.

Since two decision values are used, the change in the number of revolutions in the internal combustion engine can be surely detected.

One decision value may be used to simplify the device.

Further, the calculating equation $$\{(t/T)n - (t/T)n-1\}/(t/T)n-1$$

used in step S4 has the following advantage.

First, since the numerator of the equation calculates a difference between two ratios, it is possible to cancel a change in t/T owing to the change in the rotation period during acceleration or deceleration such as racing.

Now it is assumed that t/T is 70/180. Then, if acceleration is carried out, t/T varies to become a value smaller than 70/180. However, t/T to be subsequently calculated varies similarly and its value is equal to the above small value.

Thus, the difference between both t/T's remains fixed irrespectively both before and after the rotational fluctuation.

As regards the detection for the section B, the ratio (t/T)n at this time is equal to 0.667 and the ratio (t/T)n−1 at the previous time is equal to 0.389. Therefore, the denominator of the equation is small and the numerator is large.

The S/N (signal/noise) ratio in the section B is improved to permit the section to be easily detected.

Figure 6:
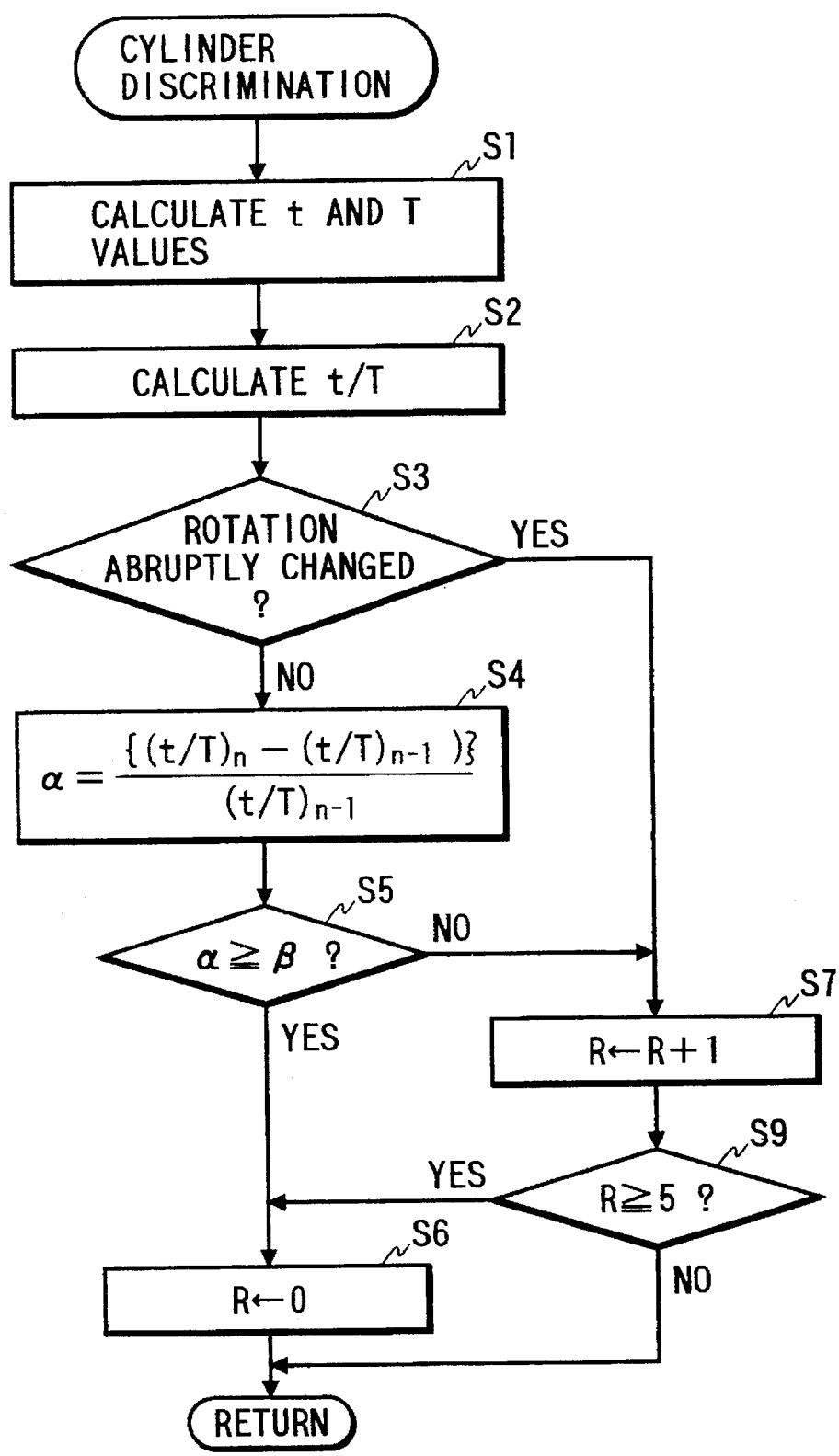
FIG. 6 is a flowchart showing a modification of the control by the present invention.

Incidentally, the first embodiment can be simplified into the flowchart in FIG. 6 in place of the flowchart in FIG. 5.

In FIG. 6, steps S6 and S7 serve as steps S8 and S10. The operation in this flowchart, which is entirely the same as FIG. 5, will not be explained here.

Embodiment 2

In Embodiment 1, the rotational fluctuation in an internal combustion engine was detected on the basis of the ratio t/T. But, it can be detected on the basis of a change in the time interval between reference angle positions.

Embodiment 2 is different from Embodiment 1 only in the method of detecting rotational fluctuation in Step S3.

Now, an explanation will be given of the method of detecting rotational fluctuation in an internal combustion engine in step S3.

A first reference angular position signal occurs at B75° in each cylinder. When the number of revolutions in an internal combustion engine is stable, the interval from the first reference angular position to the subsequent first reference angular position, i.e. the time interval between the first reference angular positions have always equal intervals.

Therefore, by comparing the time interval between the first reference angular positions measured at this time with that between the first reference angular positions at the previous time, it can be detected whether or not rotational fluctuation occurs.

In the second embodiment, this is detected using the following equation (1):

$$|T180(n) - T180(n-1) - T180/64| \leq T180(n)/8 \qquad (1)$$

In Equation (1), $T180(n)$ represents the time interval between the first reference angular positions measured at this time; $T180(n-1)$ represents that between the first reference angular positions measured at the previous time; $T180/64$ represents a periodic change which always occurs even when the internal combustion engine is stable; $T180(n)/8$ represents a periodic change which does not absolutely occur when the number of revolutions in the internal combustion engine is stable.

Specifically, in Equation (1), by subtracting the periodic fluctuation always occurring from the periodic fluctuation of the first reference angular positions between the previous time and this time, a periodic fluctuation due to acceleration or deceleration is acquired. The periodic fluctuation thus acquired is compared with the periodic fluctuation which does not occur when the number of revolutions in the internal combustion engine is stable.

Although the above description has been given for the first angular positions, the rotational fluctuation can be also detected for the second to fourth reference angular positions.

Any amount can be used as long as it is detected at regular time intervals when the number of revolutions of the internal combustion engine is stable.

The rotational fluctuation in the internal combustion engine may be detected using the fluctuation coefficient α of the ratio, but not the time interval between the reference angular positions.

In this case, step S4 is located between steps S2 and S3. In step S3, the rotational fluctuation in an internal combustion engine is detected by comparing the fluctuation ratio α of the rate calculated at step S4 with a predetermined value.

In this way, the fluctuation coefficient α of the ratio for cylinder discrimination can be used to detect the rotational fluctuation in the internal combustion engine, thus permitting the construction of the cylinder discriminating apparatus to be simplified.

In accordance with the second embodiment, the rotational fluctuation in an internal combustion engine can be detected by a simple construction.

In accordance with the second embodiment, where the time interval between the reference angular positions is used to detect the rotational fluctuation in an internal combustion engine, step S3 can be executed prior to step S2.

In this case, when the rotational fluctuation in an internal combustion engine is detected, the processing is advanced to step S8 without calculating the ratio t/T. Thus, the calculation time can be shortened.

In accordance with the second embodiment, the ratio fluctuation coefficient α of the ratio which is calculated to discriminate cylinders can also be used so that the structure for cylinder discrimination can be simplified.

What is claimed is:

1. A device for discriminating cylinders in an internal combustion engine having a plurality of cylinders comprising:

angle detecting means for generating, in synchronism with the rotation of the internal combustion engine, a rotary signal having a reference angular position signal at first and second reference angular positions corresponding to each of the cylinders and at third and fourth reference angular positions corresponding to a specific cylinder;

rotational fluctuation detecting means for detecting the rotational fluctuation in the internal combustion engine on the basis of the rotary signal;

cylinder discriminating means for discriminating cylinders when said rotational fluctuation detecting means does not detect a rotational fluctuation;

inhibiting means for inhibiting cylinder discrimination by said cylinder discrimination means when said rotational fluctuation detecting means detects a rotational fluctuation; and cylinder predicting means for predicting a current cylinder from a past cylinder discrimination result when said inhibiting means inhibits cylinder discrimination by said cylinder discriminating means.

2. A cylinder discriminating device according to claim 1, further comprising:

ratio calculating means for calculating one of the ratio of the time interval between the first and second reference angular positions to the period of a rotary signal, and the ratio of the time interval between the third and fourth reference angular positions to the period of the rotary signal, wherein said rotational fluctuation detecting means detects the rotational fluctuation by comparing said calculated ratio with a predetermined decision value.

3. A cylinder discriminating device according to claim 2, wherein said rotational fluctuation detecting means has upper and lower decision values.

4. A cylinder discriminating device according to claim 2, wherein said rotational fluctuation detecting means measures the time interval between said corresponding reference angular positions and detects the rotational fluctuation in the internal combustion engine on the basis of a time interval measured at a previous time and a time interval measured at a current time.

5. A device for discriminating cylinders in an internal combustion engine having a plurality of cylinders comprising:

angle detecting means for generating, in synchronism with the rotation of the internal combustion engine, a rotary signal having a reference angular position signal at first and second reference angular positions corresponding to each of the cylinders and at third and fourth reference angular positions corresponding to a specific cylinder;

ratio calculating means for calculating one of the ratio of the time interval between the first reference angular position and second reference angular position to the period of the rotary signal, and the ratio of the time interval between the third reference angular position and fourth reference angular position to the period of the rotary signal;

ratio fluctuation coefficient calculating means for calculating the fluctuation coefficient of said ratio on the basis of a difference between a ratio at a previous time and a ratio at a current time which have been obtained by said ratio calculating means;

rotational fluctuation detecting means for detecting the rotational fluctuation in the internal combustion engine on the basis of the fluctuation coefficient of said ratio;

cylinder discriminating means for discriminating cylinders when said rotational fluctuation detecting means does not detect a rotational fluctuation;

cylinder predicting means for inhibiting cylinder discrimination when said rotational fluctuation detecting means detects a rotational fluctuation, and for predicting a current cylinder from a previous cylinder discrimination result.

* * * * *